United States Patent [19]
Little

[11] 3,944,890
[45] Mar. 16, 1976

[54] STATIC OVERCURRENT RELAY
[75] Inventor: David W. Little, Lansdowne, Pa.
[73] Assignee: General Electric Co., Philadelphia, Pa.
[22] Filed: Sept. 10, 1974
[21] Appl. No.: 504,772

[52] U.S. Cl. ........ 317/36 TD; 317/33 R; 317/141 S; 328/142; 307/229
[51] Int. Cl.² .......................................... H02H 3/08
[58] Field of Search .......... 317/36 TD, 33 R, 33 SC, 317/31, 142, 148.5, 151, 141 S; 328/142, 143, 144, 145; 307/229, 293

[56] References Cited
UNITED STATES PATENTS

| | | | |
|---|---|---|---|
| 3,248,569 | 4/1966 | Weekes | 307/318 X |
| 3,252,007 | 5/1966 | Saari | 328/142 X |
| 3,339,114 | 8/1967 | Kelley et al. | 317/36 TD |
| 3,436,559 | 4/1969 | Wajs | 328/142 X |
| 3,496,417 | 2/1970 | Tenenbaum | 317/36 TD X |
| 3,508,140 | 4/1970 | Moses | 307/318 X |
| 3,531,689 | 9/1970 | Horn | 317/33 R X |
| 3,550,020 | 12/1970 | Gill et al. | 328/142 |
| 3,697,813 | 10/1972 | Fox | 317/36 TD |
| 3,757,234 | 9/1973 | Ohlson | 328/142 |
| 3,807,816 | 4/1974 | Hamburg | 328/143 |
| 3,849,706 | 11/1974 | Johnson et al. | 317/27 R |

OTHER PUBLICATIONS

"Electronic Trip Control For A Low Voltage, High Current Breaker," David Little, 1968 – Thesis submitted to Faculty of The Moore School of E.E.

*Primary Examiner*—J. D. Miller
*Assistant Examiner*—Patrick R. Salce
*Attorney, Agent, or Firm*—J. Wesley Haubner; Joseph H. Yamaoka

[57] ABSTRACT

A solid state protective device is disclosed which monitors an electric quantity such as current in a protected circuit and which responds to abnormal conditions by activating a circuit breaker or warning device after a period of time which is related by a non-linear inverse function to the magnitude of the circuit quantity being monitored. The device includes a non-linear function generator, using an operational amplifier to which a relatively low bias signal is supplied, to approximate the non-linear operating characteristics of earlier electromechanical protective devices.

11 Claims, 5 Drawing Figures

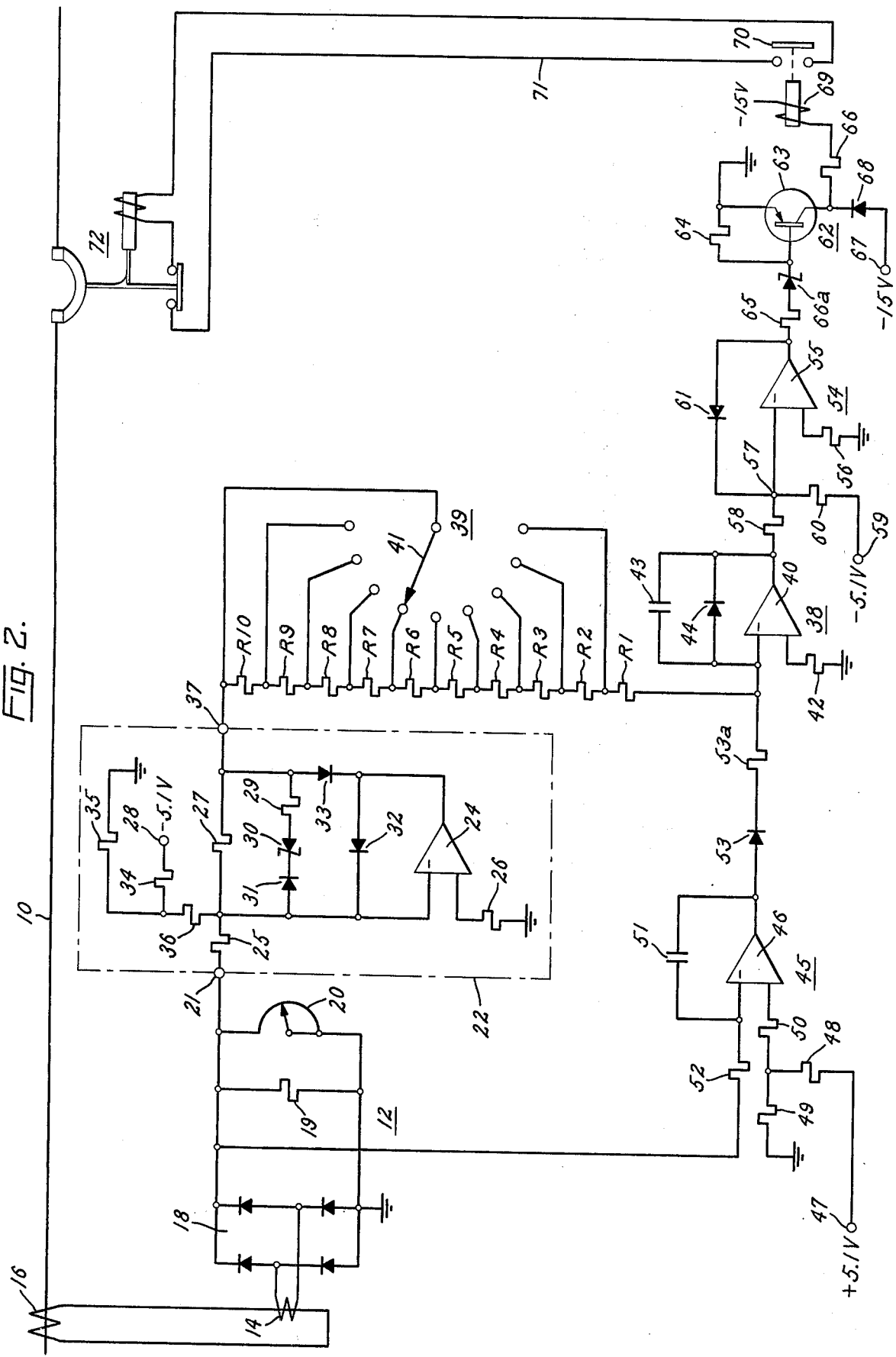

STATIC OVERCURRENT RELAY

This invention relates to means for protecting electric circuits from dangerous overcurrents, and more particularly it relates to an improved inverse time-overcurrent protective relay having all solid state components.

Historically inverse time-overcurrent protective relays were of the electro-mechanical type. Today, due to the advantages of the high reliability, low maintenance, and long life of transistors and other solid state components, static overcurrent relays using such components are being designed to replace the electro-mechanical varieties. However, in order to achieve relay coordination in electric power delivery and distribution systems, it is desirable that these new solid state relays have operating characteristics similar to those of the older electro-mechanical models. In both types of relays, the desired characteristic is that the operating time (t) be inversely proportional to a power of the current (I) in the circuit being protected, i.e., $I^n t = k$ where $k$ is a constant and $n$ is ideally 2. Electro-mechanical relays have approached this ideal characteristic but have not exactly attained it, since in these relays $n$ is not constant but depends on the amount of overcurrent. Therefore, to be useful in systems already protected by electro-mechanical overcurrent relays, solid state overcurrent relays should have operating characteristics matching those of the electro-mechanical relays they are designed to replace, even if the characteristics deviate from the $I^2 t = k$ optimum relationship in certain respects.

Electro-mechanical overcurrent rlays have been classified generally by the slope of the main part of their time-overcurrent operating characteristic as inverse (sometimes called "moderately inverse"), very inverse, and extremely inverse. See IEEE Standard for Relays and Relay Systems associated with Electric Power Apparatus, STD. 313-1971 (also ANSI Standard C37.90-1971).

Numerous schemes have been proposed in the prior art for approximating the non-linear characteristics of electro-mechanical overcurrent relays. See for example U.S. Pat. No. 3,105,920 to Dewey wherein a DC voltage which varies with the magnitude of current in a protected AC line is applied to a series resistance-capacitance time curve shaping circuit comprising a network of resistors and zener diodes arranged to alter the time contant of the circuit as a function of the magnitude of the DC voltage, whereby the time required for the capacitor to charge to a predetermined level varies inversely with a power of line current other than the first.

In Conference Paper CP62-1091, presented to the American Institute of Electrical Engineers in June 1962, E. W. Kimbark disclosed a static overcurrent relay including a non-linear voltage modifying circuit using zener diodes or the like for modifying the DC voltage applied to a series RC circuit as a function of the amount of overcurrent.

Such prior art schemes have certain disadvantages in that they require relatively large input signals and impose a relatively high burden on the intrument current transformers. Furthermore, the break points of their non-linear networks tend to be load dependent.

Another approach that has heretofore been proposed is to use log and antilog function generators ahead of an RC timing circuit. See U.S. Pat. No. 3,531,689. While this approach can produce an ideal $I^2 t = k$ characteristic, it is comparatively expensive, especially if adequate provisions are included to ensure temperature stability, and it does not solve the problem of matching the non ideal operating characteristic.

Accordingly, it is an object of my invention to more closely approach the operating characteristic of inverse and very inverse electro-mechanical overcurrent relays with an improved solid state relay characterized by its low cost, by its low burden and by its stable operating characteristic over a wide range of temperature variation.

In carrying out my invention in one form, I provide a suitable signal sensing mechanism, for example, a current transformer and full-wave rectifier, which provides a unipolar voltage input signal proportional to a current quantity in a protected line. This input signal is supplied to a non-linear function generator composed of an operational amplifier with an appropriate feed-back loop. The function generator produces at its output terminal an electric signal whose magnitude is a desired non-linear function of the input signal magnitude. The output signal of the function generator is integrated by an operational amplifier having capacitive feed-back, and this integrated output signal is compared to an appropriate reference signal by an operational amplifier used as a level detector. When the level of the reference signal is exceeded, a trip signal is emitted which may be used to activate an appropriate warning device or to trip a circuit breaker in the protected line.

The operational amplifiers used in my relay are relatively inexpensive, highly reliable and operate at low signal levels. Additionally they have very low output impedance, so that the relay's function generator does not appreciably influence the time constant of the integrator, thus greatly simplifying design.

This invention will be more fully understood and its various objects and advantages will be more fully appreciated from the following description taken in conjunction with the accompanying drawings in which:

FIG. 2 is a schematic circuit diagram of a "very inverse" time-overcurrent relay embodying a first form of the invention.

Figure 1:
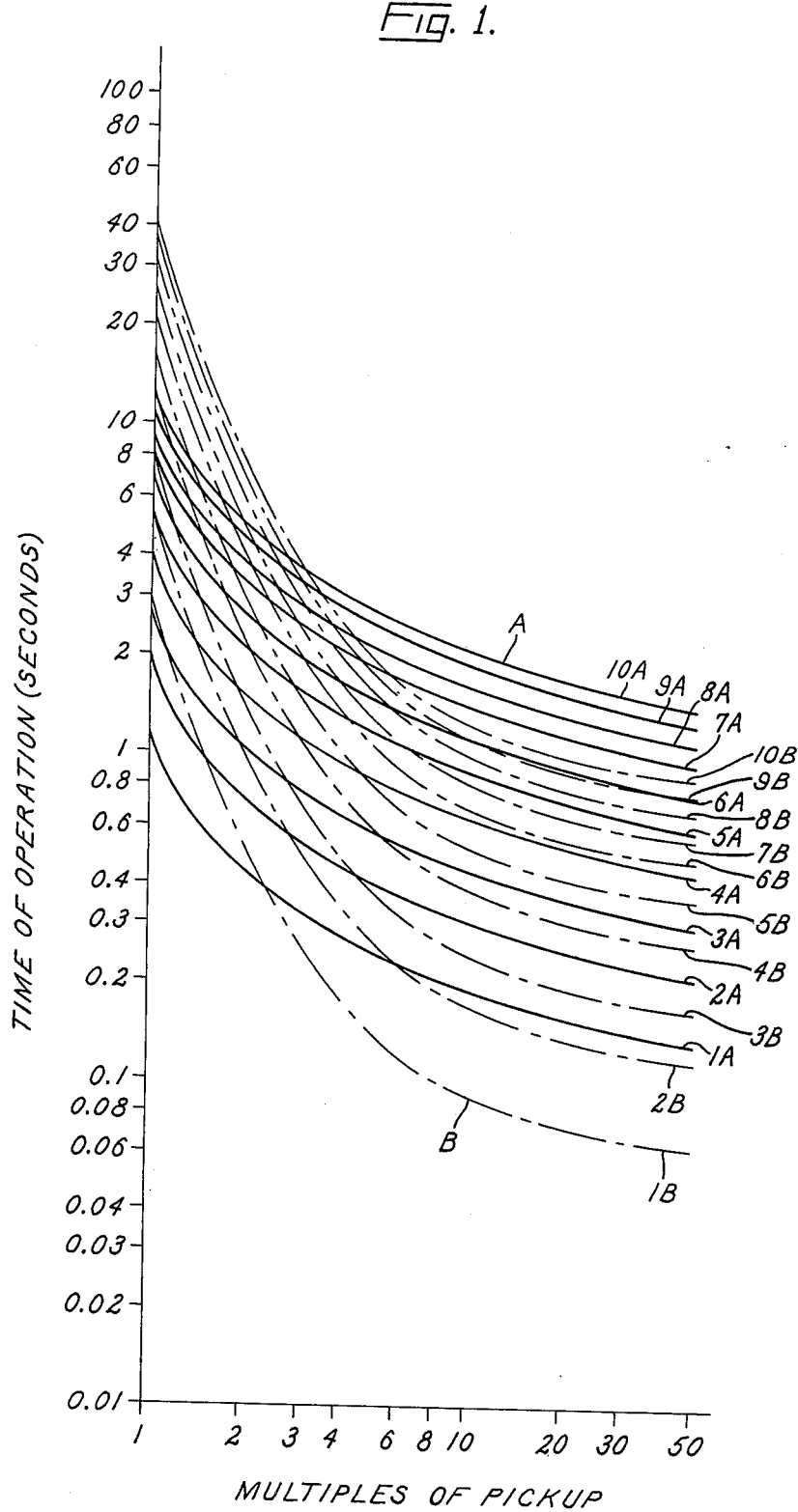
FIG. 1 is a chart of operating time plotted against multiples of overcurrent used to illustrate the operating characteristics of relays constructed in accordance with the present invention.

Referring now specifically to the drawings, the curves shown in FIG. 1 depict the operating characteristics of the two described embodiments of my invention plotted on a log-log scale. The ordinate of the graph represents the time of operation of the relay while the abscissa represents multiples of the pick-up current, i.e., the minimum current which will cause the relay to respond. The shapes of these characteristic curves are very similar to those of the electro-mechanical counterparts of the present invention. The family of solid line curves A is characteristic of the inverse relay (FIG. 4), while the family of broken line curves B characterize a very inverse relay (FIG. 2). The respective curves 1A –

A and 1B – 10B in each family correspond to different time dial settings, as will be more fully explained below.

FIG. 2 illustrates the first embodiment of my invention and shows an alternating current circuit or line 10 to which signal sensor 12 of my relay is coupled. Typically, signal sensor 12 comprises an auxiliary current transformer 14 the secondary winding of which is inductively coupled to the secondary circuit of a line current transformer 16 the primary of which conducts whatever current is flowing in the protected line. The circuit in FIG. 2 is simplified by showing a signal sensor responsive to the net current in a single-phase line; however, persons skilled in the art will recognize that the relay could be easily adapted to respond to other circuit quantities derived from single or polyphase lines if desired. For example, the signal sensor 12 could be energized by the highest of three 3-phase currents, by ground current or by a symmetrical component of line current.

The current in the secondary of the auxiliary transformer 14 of signal sensor 12 is rectified by a full-wave rectifier 18 and fed through voltage dropping resistances 19 and 20 in order to provide a unipolar voltage input signal for the succeeding components of the relay. No smoothing capacitor is connected across the DC terminals of rectifier 18, whereby the input signal is a train of undulating half cycles of unipolar voltage (see waveform 100 in FIG. 3a) whose instantaneous magnitude is proportional to the instantaneous magnitude of alternating current in the protected line 14. Thus the amplitude of the input signal is representative of the peak magnitude of line current and varies contemporaneously therewith. The resistance 20 is adjustable and is set so that the input signal under normal current conditions has a predetermined low amplitude (e.g., 200 millivolts). Thus, the greater the normal secondary current in the auxiliary transformer 14, the lower the resistance value to which the rheostat 20 is set.

The input signal from across resistors 19 and 20 is supplied to the input terminal 21 of a function generator 22, with the polarity of the voltage at this terminal being positive relative to a common potential bus (shown as ground). The function generator 22 is composed of an operational amplifier 24 whose non-inverting input is connected to the common potential bus through a resistor 26 and whose output is connected to an output terminal 37 of the function generator via diode 33. A predetermined bias signal of relatively low constant magnitude (e.g., approximately 400 millivolts) and of opposite polarity to the input signal is supplied to the inverting input of amplifier 24 by a relatively negative voltage source 28 through resistors 34, 35 and 36. The significance of this bias will be more fully explained below. Operational amplifier 24 has a feed-back path or loop containing a resistor 27 in a first branch and resistor 29, zener diode 30 and diode 31 in a second parallel branch. The diode 33 is in common with these two branches and another diode 32 is connected across the amplifier as shown. The diodes 32 and 33 when used are poled so as to serve the purpose of preventing a positive voltage from appearing at the output terminal 37 of the function generator whenever the inverting input of the amplifier 24 is negative due to the magnitude of the input signal being less than that of the bias signal.

The gain of function generator 22 changes depending on the magnitude of the input signal. When this signal is in a first predetermined range, the voltage across resistor 27 in the feed-back loop is less than the maximum voltage of the range as determined by the zener breakdown voltage (e.g., approximately 6.8 volts), and the function generator 22 produces at output terminal 37 an output signal whose magnitude is related to the input signal by a first substantially constant gain determined by the ratio of the resistance value of resistor 27 to the resistance value of the input resistor 25 (e.g., a ratio of 150K ohms to 17.8K ohms). If the input signal exceeds this maximum value and enters a second predetermined range, function generator 22 will have a second gain which is less than the first because the branch of the feed-back loop containing resistor 29 and zener diode 30 then becomes effective and the total resistance of the loop decreases (e.g., to about 20K ohms).

The output of function generator 22 developed at the output terminal 37 is applied to an integrator 38 comprising a "time dial" 39 and an integrating operational amplifier 40. The time dial 39 consists of a series of resistors R1 – R10 accessed by a rotary switch 41. The position of the switch determines the number of resistors in series between output terminal 37 and the inverting input of operational amplifier 40 and thus determines the time constant of integrator 38. The higher the series resistance of the time dial, the slower will be the rate of integration and the operation of the relay. Particular "time dial" settings, as determined by rotary switch 39, correspond to particular curves in the family of characteristic curves B shown in FIG. 1. As is illustrated in FIG. 2, the operational amplifier 40 has capacitive feed-back (via integrating capacitor 43 in parallel with diode 44), and its non-inverting input is connected to the common potential bus through a resistor 42. If desired, an RC circuit or other integrating means could be substituted for the illustrated integrator 38 as is well known in the art.

A pickup level detector and reset circuit 45 keeps the integrator 38 inoperative until the average value of the rectified input signal is above a preselected value which indicates that excessive current is flowing in protected line 10. Pickup level detector 45 is preferably on operational amplifier 46 whose non-inverting input is referenced by a positive voltage source 47 through resistors 48, 49 and 50, and whose feed-back loop contains a capacitor 51. The inverting input is connected to rectifier 18 via an input resistor 52, and the output of the amplifier 46 is connected to integrator 38 by a diode 53 and resistor 53a. The capacitor 51 across the operational amplifier 46 averages the magnitude difference between the input signal and the reference. The reference signal is selected such that the average magnitude of the input signal will equal or exceed it whenever current in the protected line 10 rises above a pickup value which is a certain per cent higher than normal. Normally the output of operational amplifier 46 is positive and the diode 53 is able to conduct. However, when pickup is reached, this output becomes negative, diodes 53 and 44 block, and capacitor 43 will begin to accumulate charge.

The integrated signal provided by the integrator 38 is fed to a level detector 54 which preferably comprises an operational amplifier 55 whose non-inverting input is connected to the common potential bus through resistor 56 and whose inverting input receives a signal from summing point 57. The summing point 57 is connected to the output of integrator 38 by way of a resistor 58 and also to a cource 59 which provides a relatively negative bias signal through a resistor 60. Operational amplifier 55 has a rectifying feedback path containing diode 61. When the integrated output voltage of integrator 38 exceeds a preselected level established by the bias due to source 59, the net positive current at the summing point 57 will flow toward level detector 54 and the level detector will produce a relatively negative trip signal that will activate a trigger circuit 62.

Since the rate of integration of the integrator 38 is proportional to the average value of the output signal produced by the function generator, the length of time required to produce the trip signal is inversely proportional to the magnitude of the function generator output. If the output of the function generator is related to the input signal by the non-linear function sought to be achieved, the desired operating characteristic will be obtained.

As it is illustrated in FIG. 2, the trigger circuit 62 consists of a transistor 63, resistors 64, 65 and 66, zener diode 66a, a voltage source 67, and a diode 68. The trip signal turns on transistor 63 thus energizing a relay coil 69. Relay contact 70, which is normally in an open position, closes as a result of current in coil 69. The closing of contact 70 activates tripping circuit 71 to open a circuit breaker 72 in protected line 10. Alternatively, an appropriate warning light or alarm could also be activated.

An important feature of my invention is the addition of the small bias signal to the inverting input of operational amplifier 24 of the function generator 22 by voltage source 28 through resistors 34, 35 and 36. As mentioned above, the rate of integration of integrator 38 is proportional to the average value of the output signal of function generator 22. For this reason, small signals take a relatively longer time to produce a trip signal than do larger signals. Since the bias is of opposite polarity to the unipolar voltage input signal and since the bias is a significantly higher percentage of a small signal than of a larger one, the bias even further retards the rate of integration for small signals while having little effect on larger signals. This gives a much better approximation to the desired relay characteristics by slowing relay operation for current values at or near pick-up. The effect of the bias will be better appreciated from the following description of FIG. 3a and FIG. 3b.

Figure 3A:
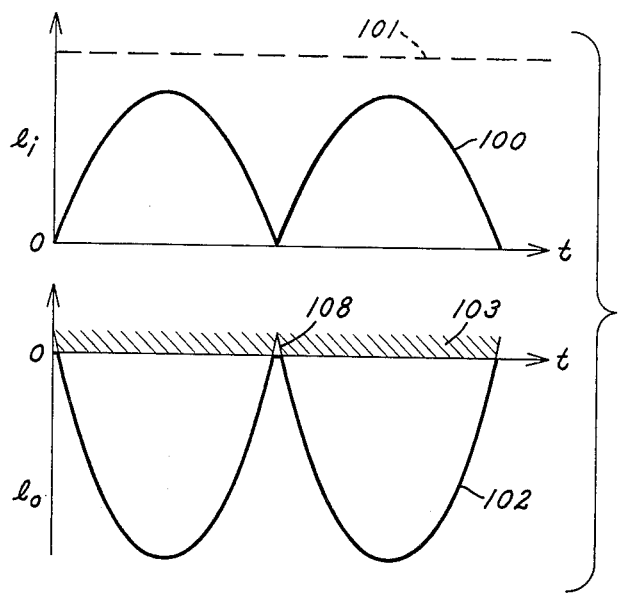
FIGS. 3a and 3b are waveform plots of the input signals applied to and the output signals resulting from the function generator used in the relay shown in FIG. 2.
Figure 3B:
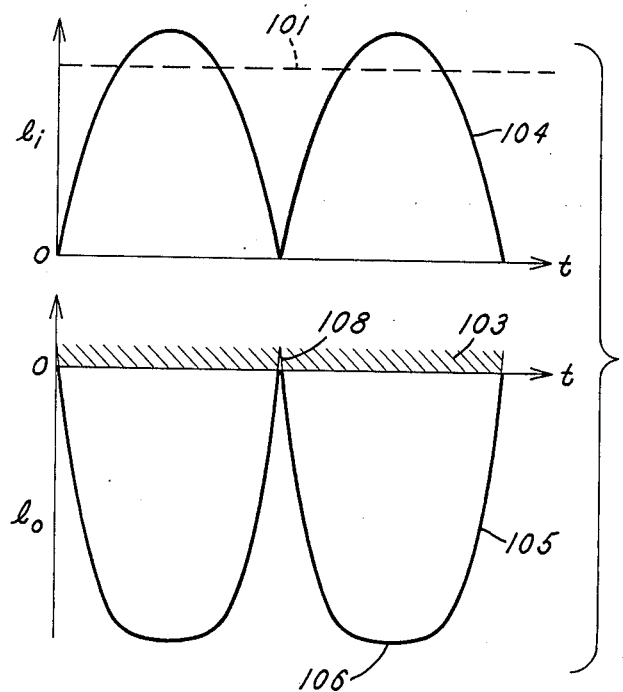

FIGS. 3a and 3b depict the waveform of the input and the output signals of function generator 22 during one cycle of current in the protected line for two different conditions. In one case, as is shown in FIG. 3a, the peak magnitude of the input signal 100 which is applied to input terminal 21 is less than the breakpoint magnitude 101 established by the zener diode 30, and the first gain of operational amplifier 24 is effective. The resulting output signal 102 of function generator 22 which appears at output terminal 37 is as shown in the lower portion of FIG. 3a. Shaded area 103 represents that amount by which the output signal is reduced due to the bias signal applied by voltage source 28. By reducing the magnitude of the output signal, the rate of integration is slowed and thus the time of operation of the relay is increased. Positive peak 108 would be produced in output signal 102 were it not for the presence of blocking diodes 32 and 33, which prevent the output from going above zero.

FIG. 3b shows a larger input signal 104 whose peak magnitude exceeds the breakpoint magnitude 101. When applied to the function generator 22 this signal causes the gain to switch to its second constant value during part of each half cycle. Since the second gain is lower than the first gain, the peak of the resulting output signal 105 is flattened as shown at 106. Due to its reduced peak, the average magnitude of the output signal 105 over a full cycle for a given input signal is decreased. Thus for overcurrents large enough to cause the second gain to be effective, the rate of integration will be slower than if the first gain continued to be effective throughout the cycle.

If function generator 22 were not present, the relay's time-overcurrent characteristic would have a slope of approximately -1 throughout its range. In order to achieve the very inverse curves B shown in FIG. 1, I have decreased the slope at high multiples of overcurrent by switching to a lower gain thereby reducing the rate of integration, and I have increased the slope at the low end of the range of overcurrent values by introducing the bias of voltage source 28, thereby slowing relay operation in this region. It should be noted in FIGS. 3a and 3b that shaded area 103 resulting from the small bias applied by voltage source 28 represents a much smaller percentage of signal 105 than it does of signal 102. Therefore the rate of integration for a large signal is not sufficiently slowed by the bias.

Figure 4:
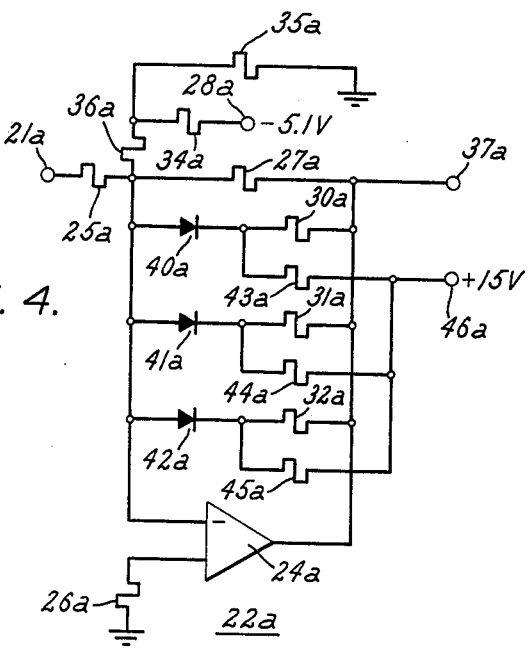
FIG. 4 is a schematic diagram of a modification of the function generator of FIG. 2 which is used to produce a relay having an "inverse" characteristic.

FIG. 4 shows an alternative function generator 22a that can be used in a second embodiment of my invention to produce a relay having an inverse time-overcurrent operating characteristic. Function generator 22a has input terminal 21a and output terminal 37a and is comprised of operational amplifier 24a whose inverting input is connected to input terminal 21a via input resistor 25a and whose non-inverting input is connected to common through another resistor 26a. Function generator 22a also includes a feed-back path comprised of four parallel branches containing resistors 27a, 30a, 31a and 32a, respectively. Three of the branches contain a diode (40a, 41a and 42a) in series with the associated resistor, with the anodes of all three diodes being connected directly to the inverting input of the operational amplifier 24a. These diodes are normally reverse biased by a voltage applied to their cathodes from a positive voltage source 46a through resistors 43a, 44a and 45a, respectively. Operational amplifier 24a is also supplied with a bias signal induced by a relatively small negative voltage source 28a. This signal is applied to the inverting input of the amplifier 24a through resistors 34a, 35a and 36a.

Typical values of resistance for the resistors of the feed-back loop are as follows:

| resistor 27a | 215 | K ohms |
| resistor 30a | 56.2 | K ohms |
| resistor 31a | 31.6 | K ohms |
| resistor 32a | 6.81 | K ohms |
| resistor 43a | 191 | K ohms |
| resistor 44a | 82.5 | K ohms |
| resistor 45a | 13.3 | K ohms |

Voltage source 46a is typically set at 15 volts with respect to common. Since these resistors have different resistance values, diodes 40a, 41a, and 42a have differing bias voltages and the net resistance in the loop will decrease in three discrete steps as the input signal increases. So long as the magnitude of the signal applied to the inverting input of operational amplifier 24a is in a first predetermined range, the function generator will have a first gain equal to the ratio of the resistance value of resistor 27a alone to that of resistor 25a. Diodes 40a, 41a, and 42a are initially all reverse biased since their anodes are at virtual ground and their cathodes are positive due to source 46a. However, when the input signal rises to the maximum limit of the first range, the input signal enters a second predetermined range in which the voltage at output terminal 37a will be sufficiently negative to lower the potential at the cathode of diode 40a below ground, thereby causing this diode to become forward biased. In this second range the feedback branch containing diode 40a and resistor 30a becomes conductive, and the second gain (which is lower than the first) of the function generator 42a becomes effective. If the input signal attains the maximum limit of this second predetermined range, it enters a third predetermined range, in which the voltage at output terminal 37a has an even greater negative magnitude which lowers the voltage at the cathode of diode 41a to a point sufficient to cause this diode also to become biased. In this range a still lower third gain becomes effective due to the addition of parallel resistor 31a to the feedback loop. A fourth and lowest gain likewise becomes effective when the input rises beyond the maximum limit of the third range, at which point diode 42a begins to conduct. The reverse bias signal applied to the operational amplifier 24a by voltage source 28a serves the same function as the bias to the source 28 in the first embodiment; namely, to reduce the average magnitude of the output signal at low input signal levels. By substituting the function generator 22a for the function generator 22, the relay shown in FIG. 2 will operate with characteristics closely approximating those of an inverse electro-mechanical overcurrent relay, as is illustrated by family of curves A in FIG. 1.

While I have shown and described several forms of my invention by way of illustration, other modifications will surely occur to those skilled in the art. It is contemplated, therefore, by the claims which conclude this specification to cover all such modifications as fall within the true spirit and scope of the invention.

What I claim as new and desire to secure by Letters Patent of the United States is:

1. A protective relay adapted to be coupled to an alternating current circuit for producing a trip signal in delayed response to the value of a circuit quantity becoming excessive, said relay comprising:
    a. means for deriving from said circuit a unipolar input signal of variable amplitude representative of said quantity;
    b. means for providing a predetermined bias signal of relatively low magnitude;
    c. function generating means to which said input signal and said bias signal are supplied in polarity opposition, said function generating means being operative to produce an output signal which varies as a non-linear function of the sum of said signals,
    d. means connected to said function generating means and operative whenever the value of said circuit quantity becomes excessive for integrating said output signal in order to produce an integrated output signal; and
    e. means connected to said integrating means capable of producing a trip signal if the integrated output signal exceeds a preselected level.

2. A protective relay as defined in claim 1 in which said function generating means includes means for blocking any appreciable output signal until the magnitude of said input signal exceeds the magnitude of said bias signal.

3. A protective relay as defined in claim 1 in which said function generating means is comprised of an operational amplifier.

4. A protective relay as defined in claim 1 in which said output signal is related to said input signal by a substantially constant gain when the input signal is within a first predetermined range and by another substantially constant gain different than said first-mentioned gain when the input signal is within second predetermined range whose minimum value equals the maximum value of said first range.

5. A protective relay as defined in claim 4 in which said function generating means is comprised of an operational amplifier.

6. A protective relay as defined in claim 5 in which said other gain is less than said first mentioned gain.

7. A protective relay as defined in claim 1 in which the instantaneous magnitude of said unipolar input signal varies contemporaneously with the instantaneous magnitude of said quantity.

8. A protective relay as defined in claim 7 in which said function generating means has at least first, second and third substantially constant gains depending on the magnitude of said sum signal, said first gain being effective so long as the magnitude of said sum signal is within said first range, said second gain being lower than said first gain and being effective whenever the magnitude of said sum signal is within said second range, and said third gain being lower than said second gain and being effective when the magnitude of said sum signal is within a third predetermined range whose minimum limit equals the maximum limit of said second range.

9. A protective relay as defined in claim 7 in which said output signal is related to said input signal by a substantially constant gain when the input signal is within a first predetermined range and by another substantially constant gain different than said first-mentioned gain when the input signal is within second predetermined range whose minimum value equals the maximum value of said first range.

10. A protective relay as defined in claim 9 in which said function generating means is comprised of an operational amplifier.

11. A protective relay as defined in claim 10 in which said other gain is less than said first mentioned gain.

* * * * *